(12) United States Patent
Soto

(10) Patent No.: US 8,702,426 B2
(45) Date of Patent: Apr. 22, 2014

(54) METHOD AND APPARATUS FOR TEACHING COSMETOLOGY

(76) Inventors: Denise J. Soto, Perrysburg, OH (US); Charles Marion Soto, legal representative, Perrysburg, OH (US)

(*) Notice: Subject to any disclaimer, the term of this patent is extended or adjusted under 35 U.S.C. 154(b) by 880 days.

(21) Appl. No.: 12/699,954

(22) Filed: Feb. 4, 2010

(65) Prior Publication Data

US 2010/0304339 A1 Dec. 2, 2010

Related U.S. Application Data

(60) Provisional application No. 61/180,952, filed on May 26, 2009.

(51) Int. Cl.
*G09B 19/10* (2006.01)

(52) U.S. Cl.
USPC ............................................ 434/94; 434/81

(58) Field of Classification Search
USPC ................. 434/94, 262–275, 219, 99–100; 132/200–211
See application file for complete search history.

(56) References Cited

U.S. PATENT DOCUMENTS

| 7,164,347 B2 | 1/2007 | Nita |
| 2002/0119428 A1 | 8/2002 | Vitale |
| 2007/0238085 A1 | 10/2007 | Colvin et al. |
| 2008/0020361 A1* | 1/2008 | Kron et al. ............... 434/262 |
| 2008/0090219 A1 | 4/2008 | Wilson et al. |
| 2008/0254424 A1 | 10/2008 | Cohen |
| 2009/0305204 A1* | 12/2009 | Connolly et al. .......... 434/219 |
| 2010/0035218 A1* | 2/2010 | Ichimi et al. ............... 434/61 |

* cited by examiner

*Primary Examiner* — Timothy A Musselman
(74) *Attorney, Agent, or Firm* — Brooks Kushman P.C.

(57) ABSTRACT

An apparatus and method is provided for teaching cosmetology. The apparatus includes a sensor and a computer-based controller. In operation, the sensor senses a cosmetology student performing a cosmetology operation and generates a sensor signal in response thereto. The controller processes the sensor signal and based thereon generates a control signal for displaying the cosmetology operation in a virtual manner on a video display.

17 Claims, 2 Drawing Sheets

METHOD AND APPARATUS FOR TEACHING COSMETOLOGY

CROSS-REFERENCE TO RELATED APPLICATION

This application claims the benefit of the U.S. Provisional Application filed May 26, 2009, and having Application No. 61/180,952, the entire disclosure of which is incorporated by reference herein.

BACKGROUND

1. Technical Field

This invention relates to a method and apparatus for teaching cosmetology.

2. Background Art

Cosmetology is conventionally taught by actually performing different techniques on a person or on a mannequin such as by cutting or styling replaceable hair for example.

SUMMARY

A method and apparatus is provided for teaching cosmetology. The apparatus includes a sensor and a computer-based controller. The sensor senses a cosmetology student performing a cosmetology operation for generating a sensor signal in response thereto. The controller includes a processor operable to execute software instructions, a computer memory operable to store software instructions accessible by the processor, and a set of software instructions stored in the memory to process the sensor signal and based thereon generate a control signal. The control signal is used for displaying the cosmetology operation in a virtual manner to facilitate teaching the cosmetology operation.

The method includes sensing a cosmetology student performing a cosmetology operation, generating a sensor signal in response to the sensing, and processing the sensor signal to generate a control signal. In addition, the method includes displaying the cosmetology operation in a virtual manner based on the control signal to facilitate teaching the cosmetology operation.

DETAILED DESCRIPTION

Embodiments of the present invention generally comprise an apparatus and method for teaching cosmetology. In general, the apparatus and method allow for displaying a cosmetology operation in a virtual manner to facilitate teaching the cosmetology operation.

Figure 1:
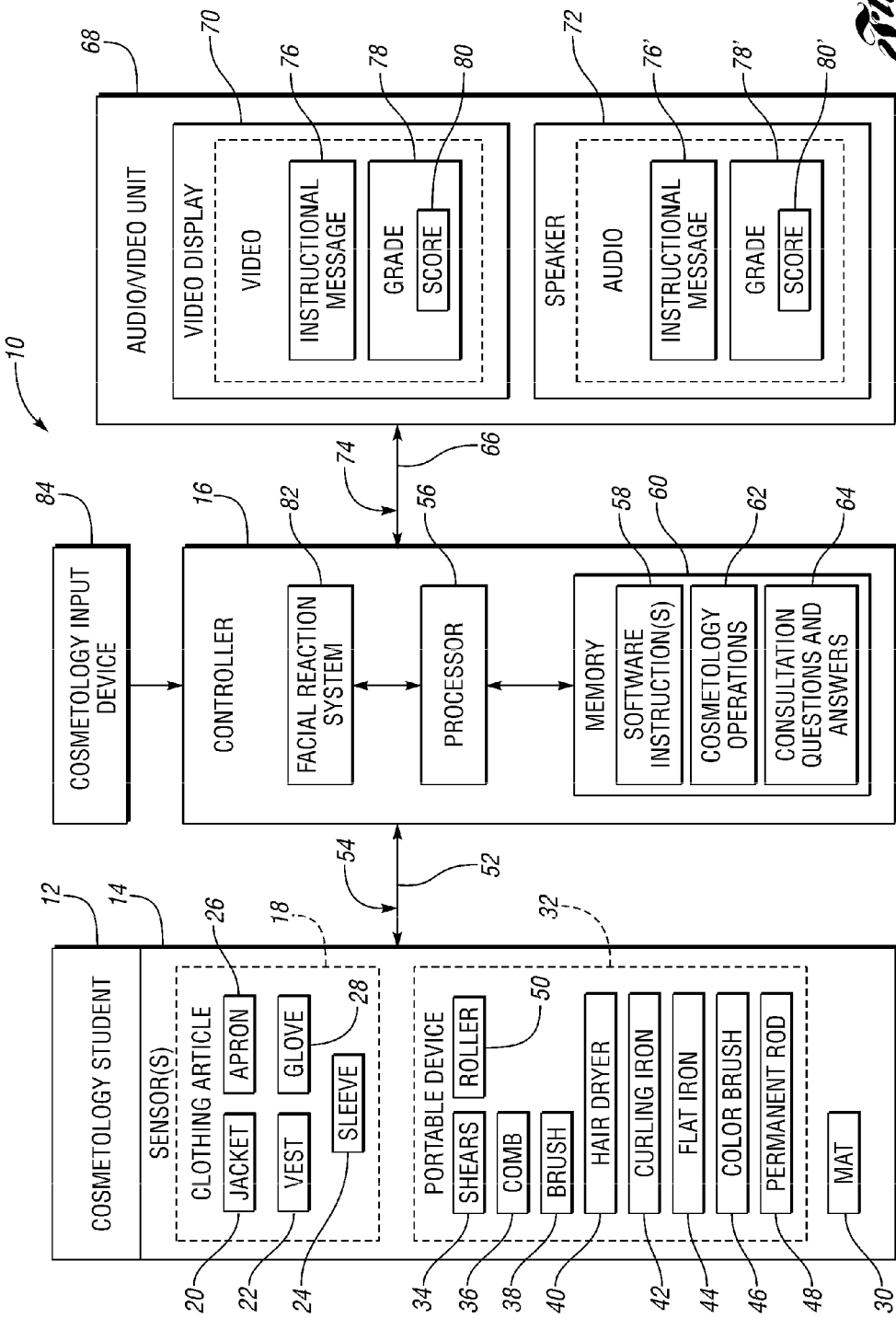
FIG. 1 is a schematic diagram illustrating an apparatus for teaching cosmetology to a cosmetology student.

With reference to FIG. 1, an apparatus 10 is provided for teaching cosmetology. In operation, the apparatus 10 facilitates teaching one or more cosmetology operations or processes to a cosmetology student 12. The apparatus 10 includes at least one sensor 14. Reference to the sensor 14 should be understood to include any number of sensors either integrated as a single unit or as separate units for the apparatus 10. In addition, the apparatus 10 includes a computer-based controller 16 or some other type of programmable logic device to control various components in the apparatus 10 for teaching cosmetology.

As illustrated in FIG. 1, the apparatus 10 may include a clothing article 18. The clothing article 18 is for the cosmetology student 12 to wear while performing the cosmetology operation. As shown, the clothing article 18 is embedded with the sensor 14 for sensing the cosmetology student 12 performing the cosmetology operation. The clothing article 18 may include a jacket 20, a vest 22, sleeve(s) 24, an apron 26, glove(s) 28, or some combination thereof. In operation, the jacket 20, vest 22, sleeve(s) 24, or apron 26 senses central body and/or arm movement while the glove 28 senses hand and finger position, orientation and/or movement of the cosmetology student 12.

Referring to FIG. 1, the apparatus 10 may include a mat 30. The mat 30 is embedded with the sensor 14. The cosmetology student 12 may stand on the mat 30 while performing the cosmetology operation to facilitate sensing of the cosmetology student 12. For example, the mat 30 may sense body movement and positioning of the student 12 standing on the mat 30.

In operation, the sensor 14 body senses the cosmetology student 12 performing at least one cosmetology operation. The cosmetology operation can be cutting, straightening, curling, razoring, clipping, brushing, styling, perming, chemical retexturizing, coloring, drying, or a combination thereof depending on the configuration of the apparatus 10. While the cosmetology student 12 performs the cosmetology operation, the sensor 14 may sense body movement of the cosmetology student 12, body position of the cosmetology student 12, body orientation of the cosmetology student 12, or a combination thereof. For example, the mat 30 may sense body movement and body position of the cosmetology student 12 standing on the mat 30 and performing the cosmetology operation.

As shown in FIG. 1, the apparatus 10 may include at least one portable device 32. The portable device 32 is embedded with the sensor 14 and allows the cosmetology student 12 to perform the cosmetology operation and to display the cosmetology operation in a virtual manner. As shown, the portable device 32 may be shears 34, a comb 36, a brush 38, a hair dryer 40, a curling iron 42, a flat iron 44, a color brush 46, a permanent rod 48, a roller 50, or other type of tool embedded with the sensor 14 for teaching the cosmetology operation. In addition, the sensor 14 may be one or more stick type sensors for sensing position, orientation, and movement of the comb 36, brush 38, hair dryer 40, curling iron 42, and/or flat iron 44. Furthermore, the sensor 14 may sense position, orientation and movement of the color brush 46, the permanent rods 48 or the roller 50.

The portable device 32 or tools for performing the cosmetology operation may be matched to specific cosmetology processes of the apparatus 10. For example, shears sensors may recognize the cut technique and the speed at which the student 12 cuts. Furthermore, the controller 16, the clothing article 18, the portable device 32, or a combination thereof may provide the cosmetology student 12 with the same feel and control of the portable device 32 as if the student 12 was actually handling regular hairstylist tools. For example, after using the shears 34, the student 12 may need to blow dry by unplugging the shears 34 and setting them down or just laying them down momentarily. Then, with the clothing article 18, the student 12 may move their own hands to pick up the portable device 32 to perform a cosmetology operations, such as straightening, curling, razoring, clipping, and brushing to add color, etc. Teaching cosmetology with the apparatus 10 can be user/learner friendly.

As shown in FIG. 1, the sensor 14 generates a sensor signal 52. The sensor signal 52 is based on sensing the cosmetology student 12. The sensor signal 52 is embedded or encoded with various types of data or information, such as the body movement, position, and/or orientation of the cosmetology student 12 performing the cosmetology operation. For example, the sensor 14 may sense body, arm, hand and finger position, orientation and movement of the student 12 to generate the sensor signal 52. The sensor signal 52 is transmitted from the sensor 14 to the controller 14 along communication path 54. Communication path 54 can be either a wireless or wired communication path depending on the configuration of the apparatus 10.

As illustrated in FIG. 1, the controller 14 includes a processor 56, such as an electronic integrated circuit or microprocessor. The processor 56 operates to execute a set of software instructions 58 to facilitate teaching the cosmetology operation. As shown in FIG. 1, the controller 16 receives the sensor signal 52 along communication path 54 and the processor 56 processes the sensor signal 52.

With continuing reference to FIG. 1, the controller 16 includes a computer-readable storage medium or memory 60. The memory 60 stores the software instructions 58. In addition, the memory 60 can store a number of predetermined cosmetology operations 62, consultation questions and answers 64, as well as other data or information for the apparatus 10 and/or to implement the method. In operation, the apparatus 10 may require the cosmetology student 12 to perform the cosmetology operations 62 in a sequential manner. For example, the apparatus 10 may require the student 12 to perform one of the cosmetology operations 62 to a predetermined level of satisfaction before the controller 16 allows the cosmetology student 12 to perform a more challenging or advanced cosmetology operation included in the cosmetology operations 62. In such an example, one mode of the apparatus 10 may be hair cutting. In the hair cutting mode, the apparatus 10 may provide the cosmetology student 12 with a number of challenges for the student 12 to complete, such as learning to hold and position the shears 34 and the comb 36 correctly. Other challenges may include basic hair cutting, intermediate, advanced, and special challenges, such as certain types of ethnic hairstyles and children.

The memory 60 of FIG. 1 is shown integrated within the controller 16. However, the memory 60 may be positioned in any suitable portion or portions of the apparatus 10 accessible by the processor 56. For example, the memory 60 may be positioned outside the controller 16 as a separate unit. While the controller 16 of FIG. 1 is shown as a single hardware device, the controller 16 may include multiple controllers in the form of multiple hardware devices, or multiple software controllers within one or more hardware devices.

In operation, the controller 16 uses the software instructions 58 to process the sensor signal 52. Based on the sensor signal 52 received along communication path 54, the controller 16 generates a control signal 66. For example, the controller 16 may determine the body movement of the cosmetology student 12, body position of the cosmetology student 12, body orientation of the cosmetology student 12, or a combination thereof to generate the control signal 66.

As shown in FIG. 1, an audio/video unit 68 may be used to display the cosmetology operation in a virtual manner. The audio/video unit 68 is shown including a video display 70 and a speaker 72. However, the audio/video unit 68 may only include the video display 70 to display the one or more cosmetology operations in a virtual manner. The controller 16 and the video display 70 are shown as separate units; however, the controller 16 and the video display 70 may be integrated with each other as one unit. The software instructions 58 for sensing the position, orientation and/or movement can also be used for displaying the control signal 66 on the video display 70 either through a wired or wireless connection. As shown, the audio/video unit 68 receives the control signal 66 from the controller 16 along communication path 74. Communication path 74 can be either a wireless or wired communication path depending on the configuration of the apparatus 10.

The video display 70 uses the control signal 66 for displaying the cosmetology operation in a virtual manner. For example, the audio/video unit 68 can use the control signal 66 to display position, orientation, and movement of the body, arm, hand, and finger on the video display 70 to simulate the actual cosmetology operation being performed by the cosmetology student 12. The position, orientation, and movement of the cosmetology student 12 may be displayed in a real-time manner to provide the cosmetology student 12 with near instantaneous feedback. The video display 70 may display various types of feedback to facilitate teaching the cosmetology operation. For example, the feedback may be displaying the cosmetology operation being performed on a virtual model or client. Physical characteristics to be displayed by the video display 70 can be stored in memory 60. As the cosmetology operation is being performed and displayed on the video display 70, the virtual model or client may appear to change physical characteristics, such as a hair length, hair color, hair style, hair texture, hair shape, and other virtual hair appearances based on the cosmetology operation is being performed. How the physical characteristics of the virtual client appear to change on the video display 70 based on position, orientation, and/or movement of the cosmetology student 12 performing the cosmetology operation facilitates teaching the cosmetology operation.

As shown in FIG. 1, the video display 70, the speaker 72 or both can provide an instructional message 76, 76' from the controller 16 to the cosmetology student 12. Thus, the instructional message 76, 76' may be a video clip, visual image, text, picture, audible sound, or some type of message the student 12 can hear or see. For example, the controller 16 can provide the instructional message 76, 76' via the control signal 66 to instruct the cosmetology student 12 on performing one of the cosmetology operations 62. In such an example, the instructional message 76, 76' can instruct the cosmetology student 12 how to hold and position the portable device 32. In addition, the instructional message 76, 76' may indicate whether the cosmetology student 12 is performing the cosmetology operation 62 correctly or how to correct any deficiency in performing the cosmetology operation 62. For example, the instruction message 76, 76' may be cut "here" and not "there." In such an example, audio from the speaker 72 can facilitate teaching, such as by telling the student 12 when the operation is being performed correctly or incorrectly and how to correct any deficiency.

Referring again to FIG. 1, the video display 70, the speaker 72 or both can provide a grade 78, 78' to the cosmetology student 12. The controller 16 determines the grade 78, 78' based on the cosmetology operation 62 that the cosmetology student 12 performs and generates the control signal 66 for displaying the grade 78, 78'. For example, the controller 16 can process the body movements of the cosmetology student 12 to provide grading of the student 12. Thus, the apparatus 10 can be used to grade hand and body coordination of the student 12. In addition, the controller 16 may grade the cosmetology student 12 on a point system. The controller 16 may use the point system to provide a score 80, 80', such as a numerical number. The score 80, 80' may be communicated to the student 12 or instructor as video, audio, or both depending on the configuration of the apparatus 10.

The apparatus 10 may include a consultation mode. The apparatus 10 may switch to the consultation mode when the cosmetology student 12 selects the consultation mode, a process or cosmetology operation 62 is chosen prematurely, or some other event occurs. When the controller 16 is in the consultation mode, the controller 16 evaluates service provided by the cosmetology student 12 for the cosmetology operation 62. For example, the apparatus 10 may determine difficulty or ease of the student 12 providing the cosmetology operation 62 with certain virtual clients. The virtual client may simulate both female and male virtual clients/models so that the apparatus 10 is not particular to just one gender. Furthermore, the controller 16 may use the sex, mood, and generally physical features of the virtual client for the exercise. Using characteristics of the virtual client can be an important aspect for teaching cosmetology since the student 12 can get a sense of what to do or what to say before having to interact directly with actual people or clients. During the consultation mode, the apparatus 10 may provide a role-play for the student 12 to act out. During the role-play, a virtual client may say it wants a certain thing. Furthermore, the virtual client may ask a certain question from the consultation questions and answers 64 stored in memory 60. The apparatus 10 may provide the user or student 12 with four options to choose from, which may be provided by the consultation questions and answers 64. At the end of the role-play, the controller 16 may grade performance of the student 12. The grade 78, 78' indicates the actual service performed by the student 12 and may be based on the mood of the virtual client that the student 12 influenced virtually. The mode of the virtual client can either increase or decrease the difficulty of the student 12 performing the cosmetology operation in a virtual manner.

As shown in FIG. 1, the apparatus 10 may include a facial reaction system 82. The facial reaction system 82 of FIG. 1 is shown integrated with the controller 16. However, the facial reaction system 82 may be located anywhere outside the controller 16 accessible by the processor 56. In operation, the controller 16 determines a facial reaction based on the service provided by the cosmetology student 12 and generates the control signal 66 for displaying the facial reaction to the cosmetology student 12 on the video display 70. The facial reaction may be displayed during the consultation mode to teach the cosmetology student 12 how the service provided by the cosmetology student 12 influenced the degree of satisfaction of cosmetology operation 62. For example, if the apparatus 12 asks the student 12 for something, such as during the role-play of the consultation mode, and the student 12 selects the wrong answer, the controller 16 may implement a corrective facial reaction to the student's answer. For example, the video display 70 may receive the control signal 66 embedded or encoded with the corrective facial reaction and display a graphical representation of the virtual client appearing sad, upset, angry, disgusted, or some other graphical representation indicating undesirable client emotion. Thus, the corrective facial reaction may be a virtual facial expression.

The facial reaction may provide real-time feedback to the student 12 on performance of the cosmetology operation 62. Thus, the student 12 does not have to wait to find out if a mistake or wrong answer has been made until the end of the cosmology routine. As such, the user knows to answer the later questions differently, such as in a more professional manner. The questions and answers for the role-play may be included in the memory 60 as the consultation questions and answers 64.

Referring again to FIG. 1, the apparatus 10 may include a cosmetology input device 84. The cosmetology input device 84 may be used by an instructor or the student 12 to select different hand and face shapes, colors, sizes, and gender, etc. on which the training is performed and displayed on the video display 70. The controller 16 may have different modes to enter for teaching cosmetology (i.e. hair cutting, coloring, styling, perms, chemical retexturizing, and even the initial/post consultation could have a mode of its own). The different modes for teaching cosmetology may be included in the cosmetology operation 62 of FIG. 1. Each mode may have its own challenges that must be completed before the controller 16 will allow the student 12 to "move on" to the next challenge. In addition, the cosmetology input device 84 may be used for the consultation mode of the apparatus 10. For example, the student 12 may use the cosmetology input device 84 to select or input an answer in response to one or more questions of the virtual client.

The cosmetology operations 62 for each task or operation may be performed in the appropriate order of tasks to be learned. The instructor or student 12 may be able to choose certain activities that they want to study. The cosmetology input device 84 may be used by the instructor or the student 12 to select the activity of study. For example, if cutting or coloring is chosen, the operations may be performed and graded on the point system to provide the grade 78, 78'. For instance, points may be awarded if the student 12 first grabs the correct tool, such as the color brush 46. Each step and each button push or hand movement may produce grading as represented by the grade 78, 78'. Positive points may be awarded for correct actions of the student 12 while points may be taken away from incorrect actions. At the end of the phase or activity, the instructor or student 12 may receive the score 80, 80'. The score 80, 80' may indicate whether the student 12 is ready to move on to the next level or to a more difficult cosmetology operation 62 stored in the apparatus 10.

The apparatus 10 may enable the cosmetology student 12 to have a whole new revolutionary way of learning to cut, style, and/or finish hair. The controller 16 can be operated through the sensor 14 and/or the cosmetology input device 84. The student 12 can be provided an experience in a virtual world of doing cosmetology, such as hair, without actually physically styling and cutting hair. Thus, tools, body coordination, process, consultation, and strategies using underlying theory can be used to teach the student 12.

Figure 2:
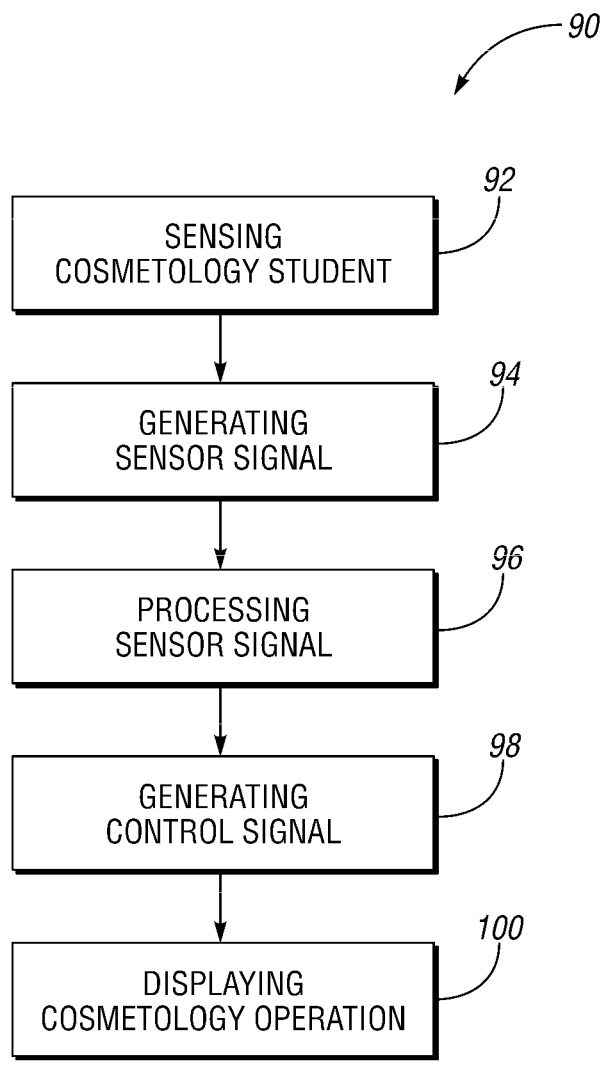
FIG. 2 is a flowchart diagram illustrating a method of teaching cosmetology.

With reference to FIG. 2, a flowchart diagram 90 is provided to illustrate a method of teaching cosmetology. For example, the method can be used to teach one or more cosmetology operations to a cosmetology student. Although the various steps shown in flowchart diagram 90 appear to occur in a chronological sequence, at least some of the steps may occur in a different order, and some steps may be performed concurrently or not at all. Furthermore, the apparatus 10 and its components illustrated in FIG. 1 are referenced throughout the discussion of the method to facilitate understanding of various aspects of the method.

The method of teaching cosmetology may be implemented through a computer algorithm, machine executable code, or software instructions programmed into a suitable programmable logic device(s), such as the controller 16 of the apparatus 10. In addition to the steps shown in FIG. 2, the programmable logic device may be programmed with additional steps to provide additional functionality.

At block 92 of flowchart diagram 90, a cosmetology student is sensed performing a cosmetology operation. The sensor 14 can be embedded in the clothing article 18, the portable device 32, the mat 30, or a combination thereof to sense the cosmetology student 12. Furthermore, the step of sensing the cosmetology student 12 may include sensing body movement, body position, and/or body orientation of the cosmetology student 12.

At block 94, a sensor signal is generated in response to the sensing of block 92. For example, the sensor 14 may generate the sensor signal in response to the movement and position of the cosmetology student 12. Furthermore, the sensor signal may indicate the body movement, position, and orientation of the cosmetology student 12 performing the cosmetology operation.

At block 96, the sensor signal is processed to generate a control signal. For example, the processor 56 of the controller 16 may be used to process the sensor signal and generate the control signal. Furthermore, the step of processing may include processing the sensor signal of block 94 to determine the body movement, position, and/or orientation of the cosmetology student 12. In addition, the control signal may be based on the body movement, position, and/or orientation of the cosmetology student 12.

At block 100 of flowchart diagram 90, the cosmetology operation is displayed in a virtual manner based on the control signal to facilitate teaching the cosmetology operation. The video display 70 may be used to display the cosmetology operation as well as the various indications of student body movement, position, and/or orientation.

As used and described herein, the term "teaching" includes not only imparting of knowledge, skills, instruction, and/or lessons to a person initially learning cosmetology, but also certifying and re-certifying. Thus, the apparatus 10 and method described herein may be used to certify or re-certify a person based on his or her performing one or more cosmetology operations.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for teaching cosmetology, the apparatus comprising:
   at least one sensor for body sensing a cosmetology student performing a cosmetology operation and for generating a sensor signal in response thereto;
   a computer-based controller including a processor operable to execute software instructions, a computer memory operable to store software instructions accessible by the processor, and a set of software instructions stored in the memory to process the sensor signal and based thereon generate a control signal for displaying the cosmetology operation in a virtual manner on a video display to facilitate teaching the cosmetology operation; and
   at least one portable device embedded with the sensor for the cosmetology student to perform the cosmetology operation, the portable device being at least one of shears, a comb, a brush, a hair dryer, a curling iron, a flat iron, a color brush, a permanent rod, and a roller for teaching the cosmetology operation,
   wherein the controller processes information on the sensor signal to determine the manner in which the cosmetology student holds and positions the portable device and provides electronic data for instructing the cosmetology student how to hold and position the portable device, and
   wherein the at least one portable device includes a first portable device being the shears and a second portable device being the comb, and wherein the instructional message includes electronic information indicating the manner in which to hold and position the shears with respect to the comb for instructing the cosmetology student.

2. An apparatus as in claim 1 wherein the sensor senses body movement of the cosmetology student performing the cosmetology operation, the sensor signal indicating the body movement, the controller determining the body movement based on the sensor signal, and the controller generating the control signal based on the body movement for displaying the cosmetology operation in the virtual manner.

3. An apparatus as in claim 1 wherein the sensor senses body position of the cosmetology student performing the cosmetology operation, the sensor signal indicating the body position, the controller determining the body position based on the sensor signal, and the controller generating the control signal based on the body position for displaying the cosmetology operation in the virtual manner.

4. An apparatus as in claim 1 wherein the sensor senses body orientation of the cosmetology student performing the cosmetology operation, the sensor signal indicating the body orientation, the controller determining the body orientation based on the sensor signal, and the controller generating the control signal based on the body orientation for displaying the cosmetology operation in the virtual manner.

5. An apparatus as in claim 1 wherein the cosmetology operation includes at least one of cutting, straightening, curling, razoring, clipping, brushing, styling, perming, chemical retexturizing, coloring, and drying.

6. An apparatus as in claim 1 further including at least one clothing article embedded with the sensor for the cosmetology student to wear while performing the cosmetology operation, the clothing article including at least one of a jacket, a vest, a sleeve, an apron, and a glove for teaching the cosmetology operation.

7. An apparatus as in claim 1 further including a mat embedded with the sensor for the cosmetology student to stand on while performing the cosmetology operation, the mat sensing body movement and position of the cosmetology student performing the cosmetology operation.

8. An apparatus as in claim 1 wherein the controller provides an instructional message embedded in the control signal for instructing the cosmetology student on performing the cosmetology operation.

9. An apparatus as in claim 8 wherein the instructional message indicates whether the cosmetology student is performing the cosmetology operation correctly and how to correct any deficiency in performing the cosmetology operation.

10. An apparatus as in claim 1 wherein the controller determines a grade based on the cosmetology operation that the cosmetology student performs and generates the control signal for displaying the grade.

11. An apparatus as in claim 1 wherein the memory stores a predetermined number of cosmetology operations to be performed in a sequential manner by the cosmetology student, the controller allowing the cosmetology student to perform one of the cosmetology operations upon satisfactory performance of another cosmetology operation.

12. An apparatus as in claim 1 wherein the controller includes a consultation mode to evaluate service provided by the cosmetology student for the cosmetology operation.

13. An apparatus as in claim 12 further including a facial reaction system, the controller generating the control signal for displaying a facial reaction to the cosmetology student, the controller determining the facial reaction based on the service provided by the cosmetology student.

14. An apparatus for teaching cosmetology to a cosmetology student, the apparatus comprising:
- at least one sensor to sense body movement of the cosmetology student performing at least one cosmetology operation and to generate a sensor signal indicating the body movement;
- a computer-based controller including a processor operable to execute software instructions, a computer memory operable to store software instructions accessible by the processor, and a set of software instructions stored in the memory to determine the body movement based on the sensor signal and to generate a control signal based on the body movement for displaying the cosmetology operation in a virtual manner to facilitate teaching the cosmetology operation; and
- at least one portable device embedded with the sensor for the cosmetology student to perform the cosmetology operation, the at least one portable device being at least one of shears, a comb, a brush, a hair dryer, a curling iron, a flat iron, a color brush, a permanent rod, and a roller for teaching the cosmetology operation,
- wherein the controller processes information on the sensor signal to determine the manner in which the cosmetology student holds and positions the portable device and provides electronic data for instructing the cosmetology student how to hold and position the portable device, and
- wherein the at least one portable device includes a first portable device being the shears and a second portable device being the comb, and wherein the instructional message includes electronic information indicating the manner in which to hold and position the shears with respect to the comb for instructing the cosmetology student.

15. An apparatus as in claim 14 wherein the sensor senses body position and orientation of the cosmetology student performing the cosmetology operation, the sensor signal indicating the body position and orientation, the controller determining the body position and orientation based on the sensor signal, and the controller generating the control signal based on the body position and orientation for displaying the cosmetology operation in a virtual manner.

16. An apparatus as in claim 14 further including at least one portable device embedded with the sensor for the cosmetology student to perform the cosmetology operation, the portable device being at least one of shears, a comb, a brush, a hair dryer, a curling iron, a flat iron, a color brush, a permanent rod, and a roller for teaching the cosmetology operation.

17. An apparatus for teaching cosmetology to a cosmetology student, the apparatus comprising:
- at least one sensor to sense body movement of the cosmetology student performing at least one cosmetology operation and to generate a sensor signal indicating the body movement;
- a controller configured to determine the body movement based on the sensor signal and to generate a control signal based on the body movement for displaying the cosmetology operation in a virtual manner to facilitate teaching the cosmetology operation; and
- at least one portable device embedded with the sensor for the cosmetology student to perform the cosmetology operation, the at least one portable device being at least one of shears, a comb, a brush, a hair dryer, a curling iron, a flat iron, a color brush, a permanent rod, and a roller for teaching the cosmetology operation,
- wherein the controller is further configured to process information on the sensor signal to determine the manner in which the cosmetology student holds and positions the portable device and to provide electronic data for instructing the cosmetology student how to hold and position the portable device, and
- wherein the at least one portable device includes a first portable device being the shears and a second portable device being the comb, and wherein the controller processes the information on the sensor signal to determine the manner in which the cosmetology student holds and positions the shears and the comb with respect to one another and provides the electronic data for instructing the cosmetology student how to hold and position the shears and the comb with respect to one another.

* * * * *